United States Patent [19]

Rafaely

[11] 4,145,992
[45] Mar. 27, 1979

[54] SYSTEM FOR WASHING MILKING CUPS IN A ROTARY MILKING MACHINE

[75] Inventor: Gilad Rafaely, Kibbutz Givat Chaim-Ihud, Israel

[73] Assignee: Givat Chaim-Ihud, Hakvutzot Vehakibbutzim Kvutzat Poalim Lehityashvut Shitufit B.M., Kibbutz Givat Chaim-Ihud, Israel

[21] Appl. No.: 829,895

[22] Filed: Sep. 1, 1977

[51] Int. Cl.² .............................................. A01J 5/00
[52] U.S. Cl. ................................................ 119/14.04
[58] Field of Search .......................... 119/14.04, 14.18

[56] References Cited

U.S. PATENT DOCUMENTS

| 1,787,152 | 12/1930 | Hapgood | 119/14.04 |
| 2,305,259 | 12/1942 | Jeffers, Sr. | 119/14.04 |
| 3,835,814 | 9/1974 | Jacobs et al. | 119/14.04 |

Primary Examiner—Hugh R. Chamblee
Attorney, Agent, or Firm—Benjamin J. Barish

[57] ABSTRACT

A system for washing milking cups in a rotary-platform type of milking machine comprises a nozzle coupled to a central water source and driven into engagement with a fluid inlet device at each station of the rotary platform as each arrives into a predetermined washing region during the rotation of the rotary platform. The system further includes fluid control means normally connecting the milking cups of all the stations to the source of vacuum, but effective to disconnect the milking cups of the station within the predetermined washing region from the vacuum and to connect same to the central water source via the nozzle after the latter has been driven into engagement with the inlet device arising in the predetermined washing region.

10 Claims, 1 Drawing Figure

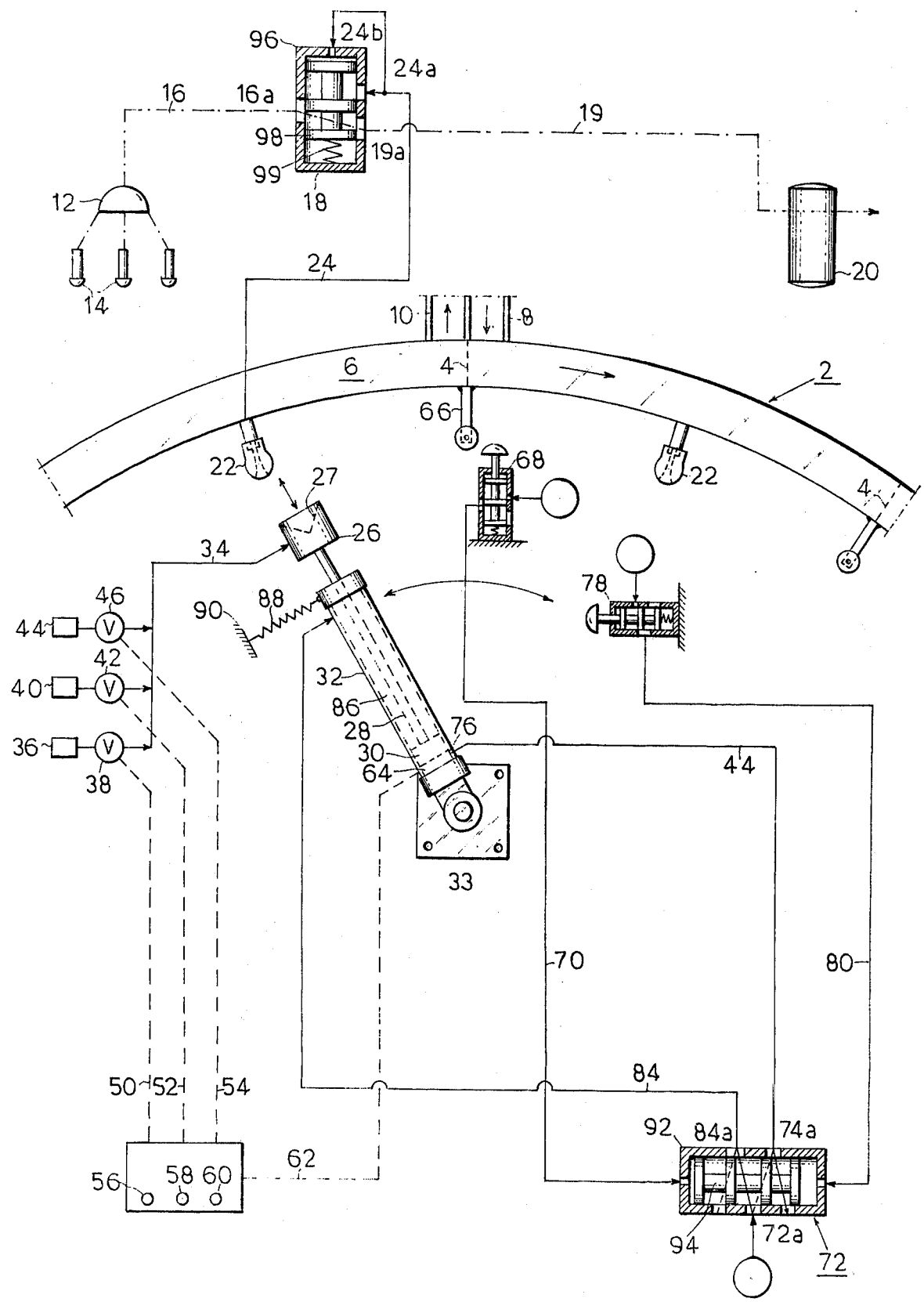

SYSTEM FOR WASHING MILKING CUPS IN A ROTARY MILKING MACHINE

BACKGROUND OF THE INVENTION

The present invention relates to a system for washing milking cups in a rotary milking machine.

Rotary milking machines are now available which include a rotary platform having a plurality of stations each adapted to receive a cow to be milked. Each station includes milking cups connected to a source of vacuum for milking the cows as they rotate on the rotary platform. Such machines usually have about 20–30 stations, each accommodating a cow, the time for a complete revolution of the platform, during which time the 20–30 cows are milked, being about 7–8 minutes.

One of the serious drawbacks in the existing rotary milking machines is the lack of a satisfactory arrangement, or any arrangement whatsoever, for washing the milking cups after they are used in milking one cow and before they are used in milking the next cow. Washing the milking cups is considered very important, and essential in many areas, to prevent the spread of disease from one cow to another.

SUMMARY OF THE INVENTION

According to the present invention, there is provided a system for washing milking cups in a rotary milking machine including a rotary platform having a plurality of cow-receiving stations, a plurality of milking cups, and a source of vacuum for the milking cups, the washing system comprising: a fluid inlet device fixed to the rotary platform at each station and rotated therewith; fluid conduits connecting the milking cups of each station to their respective inlet devices; a central water source for washing the milking cups; a nozzle connected to the central water source and movable within a predetermined washing region during the rotation of the rotary platform; drive means for driving the nozzle into engagement with the fluid inlet devices on the rotary platform as each arrives to said predetermined washing region during the rotation of the rotary platform, and out of engagement from the inlet devices as each leaves the predetermined washing region; and fluid control means normally connecting the milking cups of all the stations to the source of vacuum, but effective to disconnect the milking cups of the station within said predetermined washing region from the vacuum and to connect same to the central water source via said nozzle after the latter has been driven into engagement with the inlet device arriving into said predetermined washing region.

BRIEF DESCRIPTION OF THE DRAWING

The invention is herein described, by way of example only, with reference to the accompanying drawing diagramatically illustrating a part of a known-type of milking machine equipped with a system for washing the milking cups in accordance with the present invention.

DESCRIPTION OF THE PREFERRED EMBODIMENT

The system illustrated in the drawing comprises a known-type rotary milking machine including a rotary platform, generally designated 2, having a plurality of partitions 4 dividing the platform into a plurality of stations 6 each for receiving a cow to be milked. The cows are led onto the platform one at a time via entrance 8, and leave via exit 10 after making a complete revolution (clockwise) with the platform. Each station of the rotary platform 2 is provided with a milking unit 12 including a plurality of milking cups 14 connected via a conduit 16, a control valve 18, and a line 19, to a source of vacuum 20. In the existing machines, vacuum is applied to the milking cups for the complete interval of time the cow is in the respective station, but in the system of the present invention, the vacuum is interrupted for a short interval of time to permit automatically washing the milking cups 14 after one cow has left the respective station, via exit 10, and before the next cow enters that station via entrance 8.

The rotary platform 2 is thus provided with a plurality of fluid inlet devices 22, one for each of the stations 6. Each inlet device is fastened to the inner surface of the rotary platform and projects radially inwardly thereof. Each of the devices 22 is connected, via another conduit 24, control valve 18, and conduit 16, to the milking unit 12 of the respective station.

All the fluid inlet devices 22 carried by and rotated with platform 2 are engageable by a single nozzle 26 which is driven into engagement with, and out of engagement from, the inlet devices in succession by a piston and cylinder drive. For this purpose, nozzle 26 is secured to the end of a stem 28 carried by a piston 30 movable within a cylinder 32 pivotably mounted to a base 33 fixed within the rotary platform 2. Nozzle 26 is connected to a conduit 34 which may be selectively supplied with: (a) water from a central water source 36 via valve 38; (b) compressed air from a compressed air source 40 via valve 42; or (c) a sterilizing agent from a sterilizing agent source 44 via valve 46. Valves 38, 42 and 46 are electrically controlled by a timer 48 which produces electrical signals, via output lines 50, 52 and 54, respectively, to these valves according to a predetermined program specifying the operations to be performed, their sequence, and the time interval for each operation. This program may be preset as desired by the use of presettable knobs 56, 58 and 60 on timer 48. The timer is started by an electrical signal applied to it via line 62 from an electrical switch 64 actuated when piston 30 has been moved to its projected position wherein nozzle 26 has been driven into engagement with one of the fluid inlet devices 22 carried by the rotary platform 2.

The machine further includes a plurality of control elements 66, one for each of the stations 6 on the rotary platform 2. These control elements rotate with the platform and are sequentially engageable with a fixed control member 68 disposed within the rotary platform in their path of movement. When member 68 is engaged by one of the movable control elements 66, a signal is transmitted via fluid line 70 to a control device 72 which applies pressurized fluid via line 74 to the compartment 76 between piston 30 and the inner end wall of cylinder 32. This projects piston 30 outwardly of cylinder 32 and brings nozzle 26, carried at the end of the piston stem 28, into engagement with the fluid inlet device 22 aligned with it. Fluid is then applied from sources 36, 40 and 44, according to the sequence and time intervals programmed in timer 48, through nozzle 26 and the control inlet device 22 aligned with it, to the milking unit 12 in the respective station. The platform 2 continues to rotate while nozzle 26 is in engagement with the fluid inlet device 22 carried by the platform and while cylinder 32 pivots on base 33, until the cylinder engages a second fixed control member 78. This occurs when the cylinder has moved the arcuate distance between the inlet devices 22, which distance may be called the predetermined washing region. When cylinder 32 engages control member 78, the latter issues a signal via fluid line 80 to fluid control device 72, which then supplies pressurized fluid via line 84 to the compartment 86 between piston 30 and the outer wall of the cylinder 32, driving the piston inwardly of the cylinder and causing its nozzle 26 to disengage from the fluid inlet device 22. As soon as this disengagement occurs, cylinder 32 is pivoted in the return direction (counter-clockwise in FIG. 1) by a spring 88 secured at one end to the cylinder, and at the opposite end to a fixed member or support 90.

Fluid control device 72 includes a housing 92 having an inlet 72a and a pair of outlets 74a, 84a. A piston 94 is movable within housing 92 so that in one position of the piston it connects outlet 74a to inlet 72a, and in the other position of the piston it connects outlet 84a to inlet 72a. Outlet 74a is connected via line 74 to chamber 76 between piston 30 and the inner end wall of cylinder 32, and outlet 84a is connected via line 84 to chamber 86 between piston 30 and the outer end wall of cylinder 32.

Thus, when control member 68 is engaged by one of the movable control elements 66 on the rotary platform, a fluid signal is applied via line 70 to one end (the left end) of control device 72 to move its piston 94 to the broken-line position illustrated in FIG. 1 wherein inlet 72a is coupled to outlet 74a to transmit fluid pressure to chamber 76 in cylinder 32, thereby causing its piston 30 to move outwardly to engage nozzle 26 with the coupling device 22 with which it is then aligned; and when the nozzle has moved through the complete predetermined washing region, at which time cylinder 32 engages fixed control member 78, a fluid signal is applied via line 80 to the opposite side (right) of fluid control device 72 causing piston 94 to move leftwardly (to the full-line position illustrated in FIG. 1) wherein outlet 74a is connected to inlet 72a. Fluid pressure is thus applied via line 74 to compartment 86 within cylinder 32 causing the piston 30 within that cylinder to be retracted, thereby bringing nozzle 26 out of engagement with the fluid coupling device 22. As soon as the nozzle disengages from the coupling device, it returns with cylinder 32 to its initial position by return spring 88.

Fluid control device 18 includes a housing 96 having a piston 98 movable therein from a first position wherein its outlet 16a, and line 16 to the milking unit 12, is connected either by inlet 19a and line 19 to the vacuum source 20, or by inlet 24a and line 24 to the inlet device 22, and thereby to the nozzle 26. Control device 18, however, has only one control input, this being inlet 24b connected to line 24. The return of the piston 98 is effected by a return spring 99.

Thus, spring 99 normally maintains piston 98 in the illustrated position, wherein outlet 16a is connected to inlet 19a and the milking unit 12 is thereby connected to the vacuum source 20. However, as soon as nozzle 26 is moved into engagement with one of the fluid inlet devices 22, and pressure (either water or compressed air) is applied to nozzle 26, this pressure is transmitted via inlet 24b to move piston 98 downwardly against spring 99, whereby inlet 24a is connected to outlet 16a so that the milking unit 12 is coupled to nozzle 26 and is supplied with the fluid (water, compressed air, or sterilizing agent) fed to the nozzle.

Nozzle 26 and the fluid inlet devices 22 may be of a structure similar to that used in in-flight refueling systems of aircraft. As shown, each device 22 includes a rounded outer surface, and nozzle 26 is formed with a conical bore 27 receiving the rounded outer surface of the inlet device.

The system illustrated in the drawings operates as follows: As each cow enters its station 6 on the rotary platform 2 via entrance 8, the milking cups 14 are applied to the cow and are subjected to continuous suction from vacuum source 20 via control device 18, since piston 98 of the latter device is in its illustrated position whereby vacuum inlet 19a is connected to outlet 16a leading to the milking unit 12. In addition, at this point piston 30 of nozzle 26 is in its retracted position so that the nozzle is not engaged with any fluid inlet device 22. Thus, as rotary platform 2 rotates, the cows are led one-by-one onto the platform into their respective stations 6 and rotate with the platform while they are being milked by the suction applied from vacuum source 20 to the respective milking units 12.

As each station completes a rotation, its fluid inlet device 22 arrives into the beginning of the predetermined washing region, i.e., to the position wherein it becomes aligned with nozzle 26. When this occurs, its control element 66 engages the fixed control member 68, causing a fluid signal to be transmitted via line 70 to fluid control device 72, which moves piston 94 within that device rightwardly, to the broken-line position illustrated. In this position, inlet 72a of the device is connected to outlet 84a, so that fluid pressure is applied via line 84 to chamber 76 within drive cylinder 32, moving piston 30 within that cylinder to its projected position wherein nozzle 26 engages the fluid inlet device 22 with which it is aligned. A pressure switch 64 within chamber 76 of cylinder 32 senses when piston 30 has moved to its projected position, this being sensed by the sudden rise in pressure in chamber 76 when this occurs, at which time switch 64 transmits an electrical signal, via line 62, to timer 48. The latter signal starts the timer.

Timer 48 controls the program of operations for supplying fluid to nozzle 26 from the three different fluid sources, namely water source 36, compressed air source 40, and sterilizing agent source 44. The sequence and interval of application of these fluids is determined by the signals applied by the timer output lines 50, 52, 54, to the valves 50, 52, 54, and may be preset by presettable devices 56, 58, 60 of timer 48, as described above. As one example, the following program of operations may be used:

(1) wash with water, 2 seconds;
(2) apply compressed air and sterilizing agent, 4 seconds;
(3) dwell (to permit the sterilizing agent to act) 4 seconds;
(4) wash with water (to remove the sterilizing agent) 2 seconds; and
(5) apply compressed air (to remove the water), 2 seconds.

The above program takes 16 seconds, and an additional 2 seconds may be provided to permit the return of the nozzle by return spring 88.

As soon as nozzle 26 becomes coupled to a fluid inlet device 22 in a particular station 6, and pressurized fluid is applied via the nozzle and the coupled inlet 22 to its fluid control member 18, piston 98 within that control member is moved against spring 99, thereby disconnecting the vacuum source 20 from the milking unit 12 of that station and connecting the nozzle 26 to the milking unit 12 via inlet 24a and outlet 16a.

It will thus be seen that as nozzle 26 is coupled to a fluid inlet device 22, the milking unit 12 in the respective station is subjected to the various fluids described above, in the sequence and for the intervals set forth. During this time, nozzle 26 remains coupled to its fluid inlet device 22, so that its cylinder 32 pivots with the rotation of platform 2. As soon as the cylinder engages the fixed control member 78 (this being the end of the predetermined washing region), a fluid signal is transmitted via line 80 to fluid control device 72 which moves piston 94 of that device to its full-line position wherein inlet 72a is connected to outlet 74a. This causes pressure to be applied via line 74 to chamber 76 in drive cylinder 32, thereby effecting the retraction of piston 30 and its nozzle 26. When nozzle 26 thus disengages from its fluid inlet device 22, piston 98 within fluid control device 18 is returned by spring 98 to its normal position wherein the vacuum source 20 is re-connected via line 19, inlet 19a, and outlet 16a, to the milking unit 12. The latter unit is then applied to the next cow entering the milking machine via entrance 8, the previous cow having exited via exit 10.

Many variations in the above sequence may of course be made. Thus, in many cases all the above operations may not be required, and it may be sufficient merely to use a shortened "wash-dry" cycle, involving only the steps of washing with water (for example, hot water), and then removing the water with compressed air. In addition, the cycle may include different intervals of time for each operation, or a different sequence of operations. In fact, one of the important advantages of the described embodiment of the invention is the flexibility provided thereby in permitting, by merely presetting timer 48, the programming of the desired operation to be performed, the sequences in which they are to be performed, and the interval of time for each operation.

What is claimed is:

1. A system for washing milking cups in a rotary milking machine including a rotary platform having a plurality of cow-receiving stations, a plurality of milking cups, and a source of vacuum for the milking cups, the washing system comprising: a fluid inlet device fixed to the rotary platform at each station and rotated therewith; fluid conduits connecting the milking cups of each station to their respective inlet devices; a central water source for washing the milking cups; a nozzle connected to the central water source and movable within a predetermined washing region during the rotation of the rotary platform; drive means for driving the nozzle into engagement with the fluid inlet devices on the rotary platform as each arrives into said predetermined washing region during the rotation of the rotary platform, and out of engagement from the inlet devices as each leaves the predetermined washing region; and fluid control means normally connecting the milking cups of all the stations to the source of vacuum, but effective to disconnect the milking cups of the station within said predetermined washing region from the vacuum and to connect same to the central water source via said nozzle after the latter has been driven into engagement with the inlet device arriving into said predetermined washing region.

2. A system according to claim 1, wherein said drive means for the nozzle includes a piston movable within a cylinder, the nozzle being carried by the piston, and the cylinder being pivotably mounted so as to permit its pivotting while the nozzle is engaged with a fluid inlet device rotating with the platform.

3. A system according to claim 2, further including a spring for returning the cylinder when the nozzle has disengaged from a fluid inlet device.

4. A system according to claim 2, wherein said drive means for the nozzle includes a fixed control member and a plurality of control elements rotatable with the rotary platform and sequentially engageable with the fixed control member to drive the nozzle into engagement with each fluid inlet device as its station arrives into the predetermined washing region.

5. A system according to claim 4, wherein said drive means for the nozzle further includes a second fixed control member engageable with the cylinder after the latter has been pivoted to the end of the predetermined washing region to disengage the nozzle from the fluid inlet device of the station leaving the predetermined washing region.

6. A system according to claim 5, further including a central compressed air supply, said fluid control means including means for connecting the nozzle to the central compressed air supply for a short interval of time after being connected to the water supply and while the nozzle is still attached to a fluid inlet device.

7. A system according to claim 6, wherein said fluid control means includes a timer which is presettable to preset the intervals of time in which the nozzle is connected to the central water source and to the central compressed air source.

8. A system according to claim 7, further including means for starting the timer when the nozzle drive means has been actuated to bring the nozzle into engagement with a fluid inlet device.

9. A system according to claim 1, further including a central sterilizing agent source, said fluid control means including means for connecting the nozzle to the central sterilizing agent source for a short interval of time before being connected to the water supply and while the nozzle is still attached to a fluid inlet device.

10. A system according to claim 1, wherein each of said inlet devices includes a rounded outer surface, and the nozzle includes a conical bore receiving said rounded outer surface.

* * * * *